United States Patent
Frid et al.

(10) Patent No.: US 12,475,032 B2
(45) Date of Patent: Nov. 18, 2025

(54) EFFICIENT CONSOLIDATION FOR TWO LAYER FTL

(71) Applicant: Sandisk Technologies, Inc., Milpitas, CA (US)

(72) Inventors: Marina Frid, Jerusalem (IL); Vered Kelner, Gan Haim, IL (US); Igor Genshaft, Bat Yam (IL)

(73) Assignee: Sandisk Technologies, Inc., Milpitas, CA (US)

( * ) Notice: Subject to any disclaimer, the term of this patent is extended or adjusted under 35 U.S.C. 154(b) by 119 days.

(21) Appl. No.: 18/355,124

(22) Filed: Jul. 19, 2023

(65) Prior Publication Data

US 2024/0289268 A1    Aug. 29, 2024

Related U.S. Application Data

(60) Provisional application No. 63/486,761, filed on Feb. 24, 2023.

(51) Int. Cl.
    *G06F 12/02*    (2006.01)
(52) U.S. Cl.
    CPC ................. *G06F 12/0238* (2013.01)
(58) Field of Classification Search
    CPC .................................................. G06F 12/0238
    See application file for complete search history.

(56) References Cited

U.S. PATENT DOCUMENTS

| | | | |
|---|---|---|---|
| 8,335,907 B2 | 12/2012 | Sinclair et al. | |
| 10,359,955 B2 | 7/2019 | Inbar et al. | |
| 10,459,636 B2 | 10/2019 | Frid et al. | |
| 10,802,744 B2 | 10/2020 | Frid et al. | |
| 10,983,918 B2 | 4/2021 | Manganelli et al. | |
| 11,199,983 B2 | 12/2021 | Frid et al. | |
| 2010/0037012 A1* | 2/2010 | Yano | G06F 3/0616 |
| | | | 711/E12.008 |
| 2018/0239547 A1* | 8/2018 | Inbar | G06F 12/0246 |
| 2018/0357010 A1* | 12/2018 | Inbar | G06F 3/0619 |
| 2020/0081645 A1* | 3/2020 | Frid | G06F 3/0688 |
| 2021/0048948 A1* | 2/2021 | Frid | G06F 12/0292 |

* cited by examiner

*Primary Examiner* — Eric Cardwell
(74) *Attorney, Agent, or Firm* — Patterson + Sheridan, LLP

(57) ABSTRACT

The present disclosure generally relates to improved consolidation in dual-layer FTL. In preparation for the next control sync, the controller will generate a copy the uRegions uHeaders and will continue updating the uLayer uRegion with new uRun entries. After completing the control sync operation, the controller will then select the best consolidation candidate based on comparing the uRegion uHeaders with their copy and determining the uRegion with the maximum uRuns difference or the greatest number of uRun updates in case the uRun updates difference is less than a threshold. The controller then reads the selected mSets from the flash memory to its cache and merges the updated uRuns with the cached mSets.

19 Claims, 8 Drawing Sheets

| Copy of uHeaders | uHeaders |
|---|---|
| 24 uRuns | 24 uRuns |
| 36 uRuns | 36 uRuns |
| 48 uRuns | 48 uRuns |
| 24 uRuns | 24 uRuns |
| 36 uRuns | 36 uRuns | uRegion 0
uRegion 1
⋮
⋮
uRegion N-1

FIG. 2A

| | Copy of uHeaders | uHeaders |
|---|---|---|
| uRegion 0 | 24 uRuns | 24 uRuns |
| uRegion 1 | 36 uRuns | 48 uRuns |
| ... | 48 uRuns | 48 uRuns |
| ... | 24 uRuns | 60 uRuns |
| uRegion N-1 | 36 uRuns | 72 uRuns |

FIG. 2B

| | Copy of uHeaders | uHeaders |
|---|---|---|
| uRegion 0 | 24 uRuns | 24 uRuns |
| uRegion 1 | 36 uRuns | 48 uRuns |
| ... | 48 uRuns | 48 uRuns |
| ... | 24 uRuns | 60 uRuns |
| uRegion N-1 | 36 uRuns | 72 uRuns |

FIG. 2C

| | Cold uHeaders | (Hot) uHeaders | | | | | | |
|---|---|---|---|---|---|---|---|---|
| uRegion 0 | 24 uRuns | 36 uRuns | | | | | | |
| uRegion 1 | 36 uRuns | 48 uRuns | | | | | | |
| ⋮ | 48 uRuns | 48 uRuns | | | | | | |
| ⋮ | 24 uRuns | 60 uRuns | | | | | | |
| uRegion N-1 | 36 uRuns | 72 uRuns | | | | | | |

FIG. 2D

| | Cold uHeaders | (Hot) uHeaders |
|---|---|---|
| uRegion 0 | 24 uRuns | 36 uRuns |
| uRegion 1 | 36 uRuns | 48 uRuns |
| ... | 48 uRuns | 48 uRuns |
| ... | 24 uRuns | 60 uRuns |
| uRegion N-1 | 0 | 0 |

FIG. 2E

|  | Cold<br>uHeaders | (Hot)<br>uHeaders |
|---|---|---|
| uRegion 0 | 24 uRuns | 36 uRuns |
| uRegion 1 | 36 uRuns | 48 uRuns |
| ... | 48 uRuns | 48 uRuns |
| ... | 24 uRuns | 60 uRuns |
| uRegion N-1 | 0 | 36 uRuns |

FIG. 2F

EFFICIENT CONSOLIDATION FOR TWO LAYER FTL

CROSS-REFERENCE TO RELATED APPLICATIONS

This application claims benefit of U.S. provisional patent application Ser. No. 63/486,761, filed Feb. 24, 2023, which is herein incorporated by reference.

BACKGROUND OF THE DISCLOSURE

Field of the Disclosure

Embodiments of the present disclosure generally relates to improved consolidation in two-layer Flash Transition Layer (FTL).

Description of the Related Art

Storage devices use logical-to-physical (L2P) mapping and use management tables with control data for the dynamic mapping. The management tables are stored in the flash memory, but in order to provide high performance management, copies are maintained in the controller random access memory (RAM). Modern devices have dual-layered mapping architecture consisting of a Master Layer (mLayer) and an Update Layer (uLayer). The mLayer size is relatively big and the structure of the mLayer is regular (direct-access array). The uLayer size is much smaller and the structure of the uLayer is less regular. Mapping of the same logical block address (LBA) range can have a different size at different times.

The mLayer can be easily divided into equal segments (mSets), which can be saved to flash and loaded from flash (i.e. swapped out and in) when needed. Dividing the uLayer into such segments is not trivial. Low-RAM devices have a limited amount of RAM and therefore the RAM keeps a small uLayer of limited constant size regardless of the device capacity. The uLayer contains the most recent mapping in the form of ranges that allows for scanning only part, referred to as the Update Region (uRegion), of the uLayer during consolidation or translation. The purpose of the uLayer is to aggregate multiple control-updates for the same uRegion that has N mSets per uRegion. Each uRegion has an Update Header (uHeader) that contains the number of entries (uRun) in the uRegion and other information for the entire uRegion. In a Random Write (RW) case, uLayer overflows relatively quickly and requires consolidation of uLayer updates with mSet (mLayer). Thus, good RW performance can be achieved as a compromise between the number of accumulations of the latest updates in uLayer and the number of mSets stored on flash or memory device.

Therefore, there is a need in the art for improved consolidation of mSets in FTL's.

SUMMARY OF THE DISCLOSURE

The present disclosure generally relates to improved consolidation in dual-layer FTL. In preparation for the next control sync, the controller will generate a copy the uRegions uHeaders and will continue updating the uLayer uRegion with new uRun entries. After completing the control sync operation, the controller will then select the best consolidation candidate based on comparing the uRegion uHeaders with their copy and determining the uRegion with the maximum uRuns difference or the greatest number of uRun updates in case the uRun updates difference is less than a threshold. The controller then reads the selected mSets from the flash memory to its cache and merges the updated uRuns with the cached mSets.

In one embodiment, a data storage device comprises: a memory device; and a controller coupled to the memory device, wherein the controller is configured to: manage a dual-layered FTL mapping consisting of a master layer (mLayer) and an update layer (uLayer), wherein the mLayer is further divided to mSets and the uLayer is further divided to uRegions, each uRegion includes uRun updates of mSets listed in the uRegion uHeader and its copy; perform a control sync operation; select a uRegion for consolidation according to a selection criteria; and perform consolidation.

In another embodiment, a data storage device comprises: a memory device; and a controller coupled to the memory device, wherein the controller is configured to: perform a first consolidation on a first uRegion, wherein the first uRegion is a uRegion that has a greatest number of uRuns updated compared to other uRegions; save a first mSet to cache, wherein the mSet includes uRuns from the first uRegion; determine that another uRegion is ready for a second consolidation; and perform the second consolidation on the another uRegion.

In another embodiment, a data storage device comprises: means to store data; and a controller coupled to the means to store data, wherein the controller is configured to: retain a copy of uHeaders utilized during control sync operations for use during a consolidation operation; and select a uRegion for the consolidation operation based upon a difference between the copy of uHeaders and uHeaders for uRuns.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A shows example uHeaders and entries of mapping information prior to synchronizing the mapping information, according to an exemplary embodiment.

FIG. 2B shows example uHeaders and entries of mapping information with an update to the mapping information during a synchronization of the mapping information, according to an exemplary embodiment.

FIG. 2C shows example uHeaders and entries of mapping information after synchronizing the mapping information, according to an exemplary embodiment.

FIG. 2D shows example uHeaders and entries of mapping information after a control sync operation, according to an exemplary embodiment.

FIG. 2E shows example uHeaders and entries of mapping information after copying back the mapping information, according to an exemplary embodiment.

FIG. 2F shows example uHeaders and entries of mapping information after completing consolidation of the mapping information, according to an exemplary embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved consolidation in dual-layer FTL. In preparation for the next control sync, the controller will generate a copy the uRegions uHeaders and will continue updating the uLayer uRegion with new uRun entries. After completing the control sync operation, the controller will then select the best consolidation candidate based on comparing the uRegion uHeaders with their copy and determining the uRegion with the maximum uRuns difference or the greatest number of uRun updates in case the uRun updates difference is less than a threshold. The controller then reads the selected mSets from the flash memory to its cache and merges the updated uRuns with the cached mSets.

Figure 1:
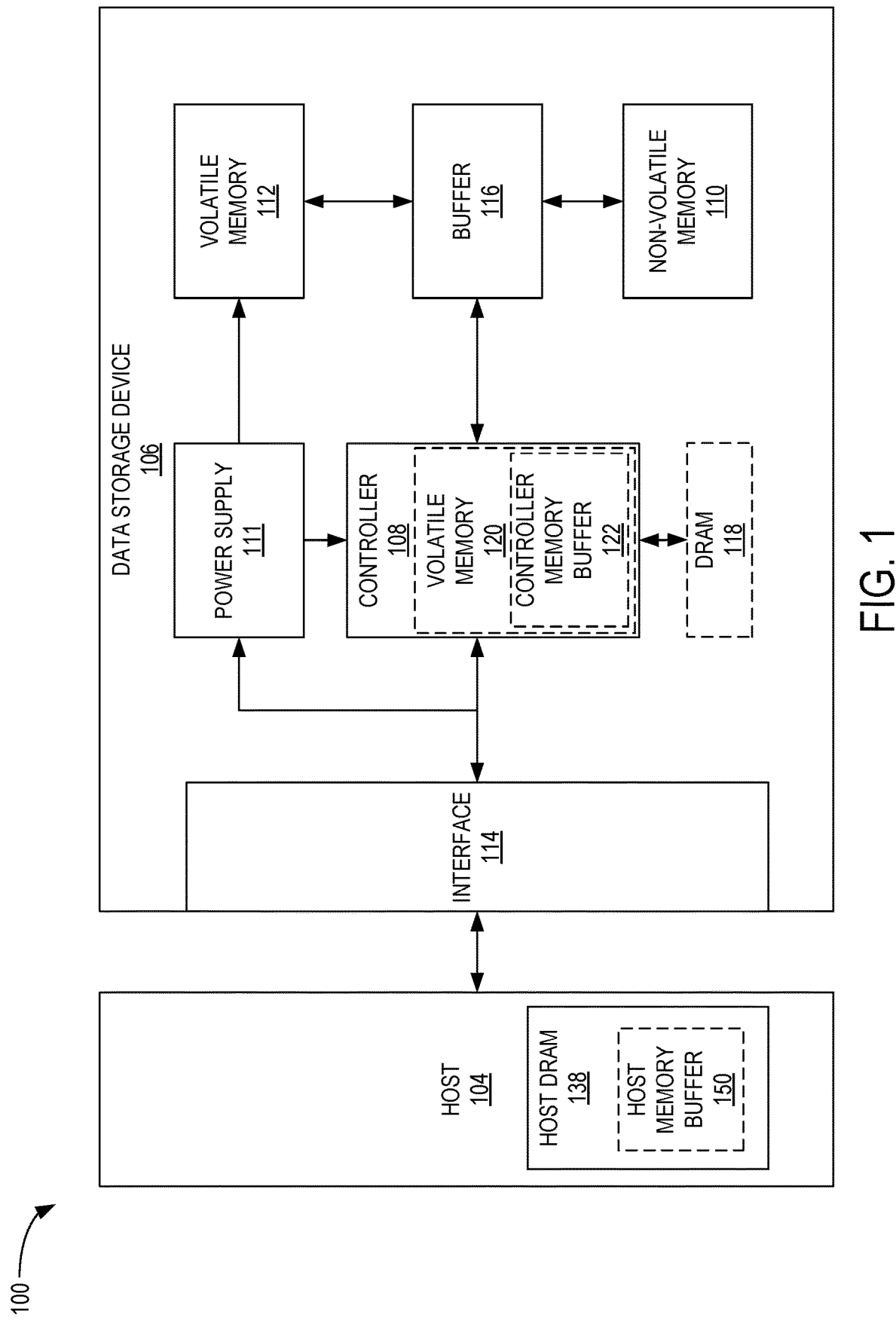
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

RW performance is central processing unit (CPU) limited. Thus, skipping uLayer updates and reducing the amount of consolidation should improve RW performance and write amplification (WAMP). Predicting, preselecting, and preloading mSets with the maximum updates between two flash saves would be valuable and enable skipping uLayer updates and updates related to set for consolidation in cached address tables (CATs) in RAM, which necessitates an algorithm to choose mSets as the best candidate for consolidation. The mSet is loaded into cache as a candidate for consolidation and contains all mapping while the uLayer does not contains the uRuns. As a result, all such mSets must be saved in flash on/before a control sync (CS) operation. After completion of storing the mSets in flash, the same mSets might be selected as the best candidate for consolidation again, or not.

As will be shown below, double uHeaders can be used in a non-blocking control sync (NBCS) structure for getting information about the mostly updated uRegions after a CS operation and after the previous consolidation. The NBCS structure allows calculation of the difference between the number of uRuns for each uRegion at the beginning (i.e., cold uHeader) and at the end (i.e., hot uHeader) of the CS operation. The difference for each uRegion may indicate that the uRegion has enough updates during the CS operation to select the uRegion as the candidate for consolidation.

Referring to FIGS. 2A through 2F, a process of updating uHeaders and entries of mapping information is illustrated, according to an exemplary embodiment. FIG. 2A shows example uHeaders and entries of mapping information prior to synchronizing the mapping information. In the examples of FIGS. 2A-2F, the uLayer contains N uRegions, and the item pool and uHeader item contains 12 uRuns. It is to be understood that 12 uRuns is merely for exemplification purposes as other numbers of uRuns is contemplated.

The uHeaders and the copy of uHeaders may be generated in response to a synchronize instruction to perform synchronization and prior to initiating the synchronization. Copies of the uHeaders are created in preparation for the CS operation. It is important to note that there is no consolidation after CS preparation until after CS completion. In the example shown in FIG. 2A, each uHeader indicates a number of entries for a corresponding uRegion. Each copy of a uHeader is identical to a corresponding uHeader prior to the CS operation. All of the uRuns in each off the uRegions create the uLayer. In one aspect, the controller 108 performs synchronization based on the copy of uHeaders, rather than the uHeaders. Thus, the uHeaders may be updated or modified during the synchronization.

FIG. 2B shows example uHeaders and entries of mapping information with an update to the mapping information during a synchronization of the mapping information, according to an exemplary embodiment. In the example shown in FIG. 2B, the controller 108 generates a new entry in uRegion 1 and new entries for uRegions N-1 and N-2. The new entries are shown by the dotted uRuns while the previous uRuns are shown by the striped uRuns. The copy of the uHeaders reflects the state of the CS at the start of synchronization. The uHeaders reflect the current state of the uRuns that have grown during synchronization. The uHeaders for uRegion 1 and the other uRegions with the new entries are updated. In one aspect, each uHeader indicates a total number of entries for a corresponding uRegion after generating new entries for the uRegion. Meanwhile, the controller 108 maintains the copy of uHeaders in the unchanged uRegions during the synchronization, because no updates are made to the unchanged uRegions after initiating synchronization. Hence, each copy of uHeader indicates a number of entries for a corresponding uRegion prior to initiating the synchronization, where each uHeader may indicate a number of entries for a corresponding uRegion after the update in mapping information during the synchronization. Consolidation is not done during the CS because if the part of uRegion is cleared then the states in which the uRun is in or previous was in cannot be recovered. Consolidation is recommended to be pushed before have the CS is started.

During the CS operation, which involves writing the uLayer to flash), the item pool and copy of the uHeaders are saved in flash as a dump. The copy of the uHeaders is not changed and describes the uLayers in the before CS operation state. The uHeaders are updated according to the new mapping but the uHeaders are not saved in flash. The uRegion's content is updated by adding uRuns so the before CS operation part of the uRegions is not changed. Thus, the copy of uHeaders is saved in the before CS operation state, but in RAM, the uLayer is updated and remains always up to date.

FIG. 2C shows example uHeaders and entries of mapping information after synchronizing the mapping information, according to an exemplary embodiment. The controller 108 may remove the copy of uHeaders after completing the CS operation, and the uHeaders will contain all old and new mappings. If needed, consolidation may then occur.

The NBCS structures are used during CS operations only. Therefore, the NBCS structures can also be used between two CS operations with a consolidation trigger for the skip uLayer algorithm. As discussed below, the method will involve using the NBCS structure between two CS operations. The method involves copying the hot uHeader to the colder uHeader fields after each copy back of a uRegion. More precise change of uRegions will equal the number of hot uRuns minus the number of cold uRuns which will help to choose the more relevant uRegion for consolidation. The approach helps to stop selection of the same mSets again if the mSet does not have a new uRun during the CS operation/consolidation. Thus, on CS operation/consolidation completion, the same uRegion might be chosen as the best candidate for consolidation, or not, according to the criteria. The approach will help to automatically enable/disable the skip uLayer feature for the workloads of interest without forcing an enable/disable setting. To achieve such a result, a check occurs regarding whether skipping the uLayer is efficient for the current workload and then a decision can be made during consolidation or CS operation completion.

FIG. 2D shows example uHeaders and entries of mapping information after a control sync operation, according to an exemplary embodiment. In particular, FIG. 2D illustrates a situation where consolidation is needed. Again, the uLayer contains N uRegions, an item pool, and an uHeader item that contains 12 uRuns. After the CS operation where the consolidation is needed, the best candidate for consolidation is chosen. The best candidate will have the maximum uRuns (e.g., 72 uRuns in this example). There is no nested consolidation/making dirty mSets during consolidation until consolidation completion. The updated N-1 with more uRuns in FIG. 2B are now being consolidated in FIG. 2D. Please note that consolidation can be run simultaneously for all uRegions that have updated uRuns, but for the purpose of understanding only the N-1 uRegion will be discussed in reference to consolidation. The N-1 uRegion is chosen for consolidation because the N-1 uRegion has the greatest uRun change compared to the other uRegions that were updated, as well as the largest number of uRuns. All of the mSets related to the N-1 uRegion are uploaded to the cache. The NAND copy does not contain all the updates that the uLayer contain.

FIG. 2E shows example uHeaders and entries of mapping information after copying back the mapping information, according to an exemplary embodiment. After all of the mSets have been updated in the N-1 uRegion as done in FIG. 2D, the N-1 uRegion may now be cleared in FIG. 2E. The Cold uHeaders and the uHeaders are both zeroed after the N-1 URegion is cleared. Since the mSets have been cleared the uLayer does not contain any mSets. The mSets now have to be stored in the cache so the mSets are not lost to new uRuns. While mSets are being written to the cache new uRuns may arrive to the N-1 uRegion. In particular, after consolidation copy back, uRegion N-1 has the uheader copies to the cold uHeader. The uRuns can also arrive in uRegion N-1 while the mSet is being written to flash. Thus, uRegion N-1 might also be chosen (or not) as a dirty mSet candidate.

In another embodiment, while the mSets are in a state to be stored to the memory device, the controller 108 can continue to collect new updates only in the mSet without duplicating the uLayer. Continuing to collect new mSets allows for the storing of all mSets to only be done one time after all consolidation is complete. Rather than starting the consolation process from the beginning to then storing the mSets in the cache multiple times, the controller 108 only has to store the mSets to the cache once.

FIG. 2F shows example uHeaders and entries of mapping information after completing consolidation of the mapping information, according to an exemplary embodiment. FIG. 2D and FIG. 2E will be referenced in this embodiment. The uLayer may contain mSet for X and mSets for Y. The mSet for X is all of the mSets in the uLayer at before CS. The mSet for Y is all of the mSets that have be added to the uLayer during the CS. After the controller 108 has selected a uRegion to consolidate (N−1 uRegion) the mSet for X and the mSet for Y are cleared from the uLayer and sent to the cache. Before the mSet for X and the mSet for Y are stored to the cache new mSet for Z maybe added to the N−1 uRegion. As an mSet for Z is added to the N−1 uRegion the uHeader is updated for the number of mSets's for Z added. The cold uHeaders for the N−1 uRegion still zero since there are no mSet's for X in the N−1 uRegion. Once all of the mSet's for Z have been added to the N−1 uRegion, the controller will then clear the N−1 uRegion and add the mSet for Z to the cache. Now that all of the mSets (X, Y, and Z) have been added to the cache. The controller 108 can now store all the mSets to the cache.

In particular, after consolidation completion, the method involves choosing the best candidates for making dirty mSets according to the maximum number of uRuns and the difference between the number of uRuns and the number of uRuns after the CS operation. In the example of FIG. 2F, the uRegions 0, 1, N−1, and N−2 will be selected for making consolidated mSets, but uRegion 2 is not selected because the cold uHeader equals the hot uHeader.

In another embodiment, if several uRegions have many RW updates during CS operation or during consolidation, the uRegions will continue to receive many updates. After the completion of the CS operation/consolidation, the best candidate for consolidation of the mSets is according to a criteria. The criteria being the max number uRuns in the uRegion when change in uRegion (DeltaOfRegion)=Hot−Cold (uHeader)>N (N TBD). The criteria allows the controller 108 to select a suitable uRegion to the current workload with a maximum number of uRuns (numURuns) and enough new uRuns since the last CS/consolidation. The uRegions/mSets with the maximum DeltaOfRegion can be chosen as the best candidate for consolidation. However, the preferable option is to choose an uRegion that has accumulated a lot of uRun prior to CS/consolidation. Also choosing a uRegion that has a DeltaOfRegion>N (N TBD), if the sum of the new+old (uRun) is maximum. The combined criteria will be effective for some cases. For example, 1 GB RW (all mSets can be in cache), 4-8 GB RW (¼-⅛ mSets can be in cache), 32 GB RW (small number mSets of the workload can be in cache). In wide RW cases when all uRegions have DeltaOfRegion>N, the condition for the best candidate for consolidation becomes the current condition.

The delay between reading the appropriate loaded for consolidation mSets and writing the mSets to flash will provide a better accumulation of uRuns in such mSets and will also reduce mSets write amplification (WAMP). Skipping the maximum number of new updates in the uLayer will reduce the time for SAT updates.

Figure 3:
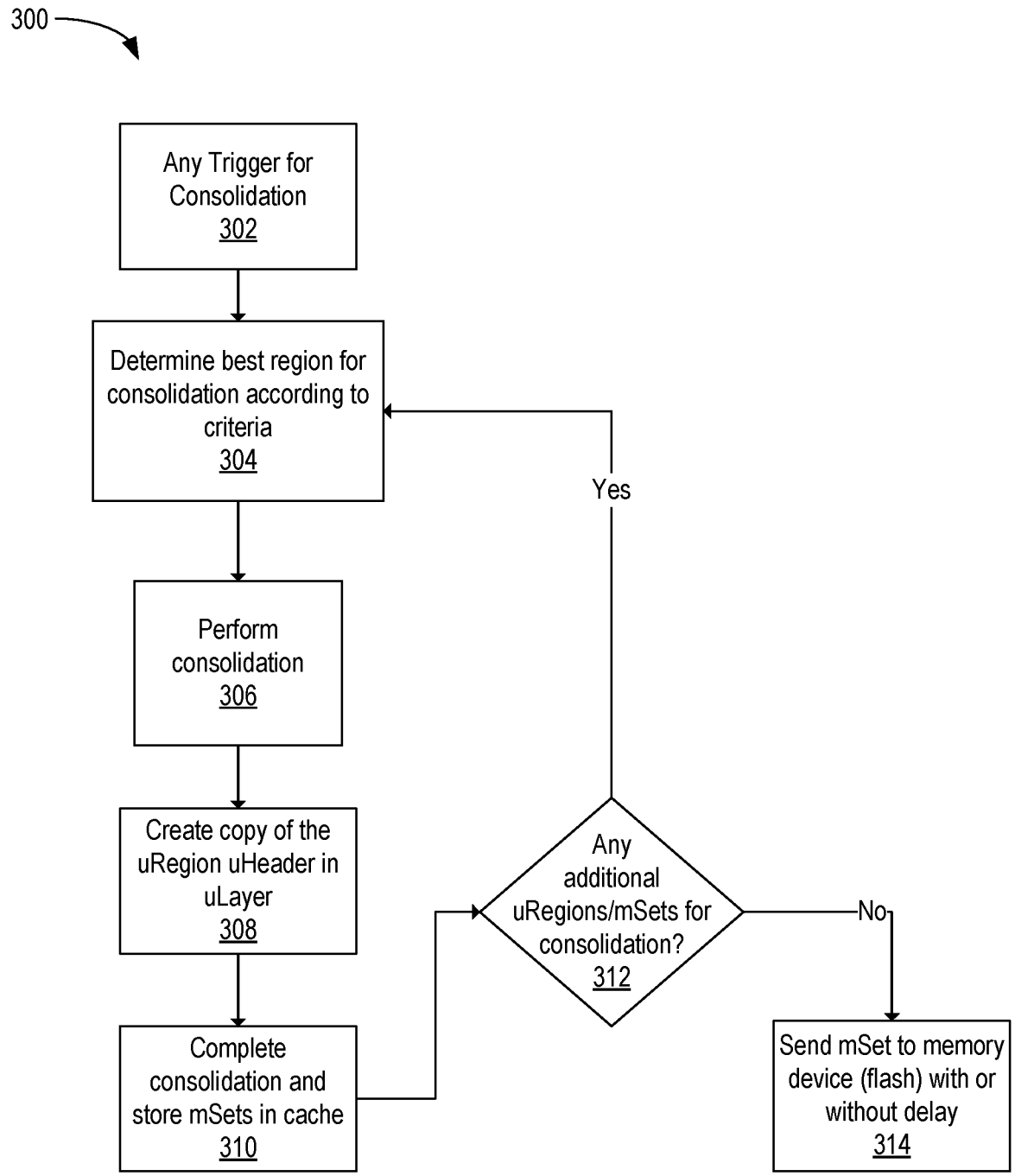
FIG. 3 is a flow chart illustrating a method for consolidating, according to certain embodiments.

FIG. 3 is a flow chart illustrating a method 300 for consolidating, according to certain embodiments. The method 300 begins at block 302. At block 302, when the controller, such as the controller 108 of FIG. 1, determines consolidation is appropriate, any trigger for consolidation is allowed. At block 304, the controller determines the best uRegion of consolidation according to criteria. The criteria is comparing the copy of uHeaders to the uHeaders. The comparing of the copy of uHeaders to the uHeaders is analyzing which uRegions has gained new uRuns. It is to be understood that even though for this example only one uRegion is selected for consolidation, multiple uRegions may be selected for consolidation to be consolidated simultaneously. At block 306, the controller performs the consolidation. After the consolidation at block 308, copies of the consolidated uRegion uHeader are created in the uLayer. At block 310, the consolidation is completed and the mSets are stored in the cache. At block 312, the controller determines whether there are any additional uRegion/mSets for the consolidation. If t the controller determines that there are additional uRegions/mSets to consolidate then the method 300 returns to block 304. If the controller determines there are no additional uRegions/mSets for consolidation then the method 300 proceeds to block 314. At block 314, the controller sends the mSet to the memory device.

By using the new method of consolidation, the controller avoids the problem of precise selection of the best candidate for consolidation, especially in a DRAM-less case, because RAM does not have enough for allocation of update counters per each mSet.

In one embodiment, a data storage device comprises: a memory device; and a controller coupled to the memory device, wherein the controller is configured to: manage a dual-layered FTL mapping consisting of a master layer (mLayer) and an update layer (uLayer), wherein the mLayer is further divided to mSets and the uLayer is further divided to uRegions, each uRegion includes uRun updates of mSets listed in the uRegion uHeader and its copy; perform a control sync operation; select a uRegion for consolidation according to a selection criteria; and perform consolidation. The consolidation comprises reading the selected mSet from the flash memory to the cache. The consolidation comprises merging the additional uRuns to the mSet stored in the uLayer. The consolidation comprises storing the mSet in the memory device after merging and removing the merged uRuns from uLayer. The uRegion uHeaders include uRun updates and other uRegion information. The selection criteria comprises comparing uHeaders to a copy of the uHeaders, wherein if the difference between the uHeaders is same for two uRegions, select the uRegion with max number of uRuns. The copy of uHeaders is created prior to the control sync operation while preparing for the control sync operation. The copy of uHeaders is retained after completion of the control sync operation. The copy of uHeaders are identical to a corresponding uHeader prior to the control sync operation. The controller is further configured to accumulate additional uRuns for the uRegion during preparing and performing a non-blocking control sync operation.

In another embodiment, a data storage device comprises: a memory device; and a controller coupled to the memory device, wherein the controller is configured to: perform a first consolidation on a first uRegion, wherein the first uRegion is a uRegion that has a greatest number of uRuns updated compared to other uRegions; save a first mSet to cache, wherein the mSet includes uRuns from the first uRegion; determine that another uRegion is ready for a second consolidation; and perform the second consolidation on the another uRegion. The another uRegion is the first uRegion. Prior to the second consolidation, uRuns from the first uRegion are merged with the first mSet. The another uRegion is a uRegion that has a greatest number of uRuns updated compared to other uRegions. The controller is configured to perform a consolidation operation prior to performing a control sync operation. The control sync operation involves creating a copy of uHeaders. The copy of uHeaders is retained during the first consolidation.

In another embodiment, a data storage device comprises: means to store data; and a controller coupled to the means to store data, wherein the controller is configured to: retain a copy of uHeaders utilized during control sync operations for use during a consolidation operation; and select a uRegion for the consolidation operation based upon a difference between the copy of uHeaders and uHeaders for uRuns. The controller is further configured to: delay writing mSets to the means to store data; and write the mSets to cache prior to writing the mSets to the means to store data. The data storage device is dynamic random access memory (DRAM) less.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
manage a dual-layered FTL mapping consisting of a master layer (mLayer) and an update layer (uLayer), wherein the mLayer is further divided to mSets and the uLayer is further divided to uRegions, each uRegion includes uRun updates of mSets listed in a uRegion uHeader and a copy of the uRegion uHeader;
perform a control sync operation;
select a uRegion for consolidation according to a selection criteria, wherein the selection criteria comprises comparing the uRegion uHeaders to their copy of the uRegion uHeaders, select the uRegion with max uRuns difference based on the comparison of the uRegion uHeaders to the copy of the uRegion uHeaders, and wherein if the difference between the uRuns in the uHeaders is the same for two uRegions, select the uRegion with max number of uRuns; and
perform consolidation.

2. The data storage device of claim 1, wherein the consolidation comprises reading a selected mSet from a flash memory to a cache.

3. The data storage device of claim 2, wherein the consolidation comprises merging additional uRuns to an mSet stored in the uLayer.

4. The data storage device of claim 2, wherein the consolidation comprises storing an mSet in the memory device after merging and removing the merged uRuns from the uLayer.

5. The data storage device of claim 2, wherein the uRegion uHeaders include uRun updates and other uRegion information.

6. The data storage device of claim 1, wherein the copy of uRegion uHeaders is created prior to the control sync operation while preparing for the control sync operation.

7. The data storage device of claim 6, wherein the copy of uHeaders is retained after completion of the control sync operation.

8. The data storage device of claim 7, wherein the copy of uHeaders are identical to a corresponding uHeader prior to the control sync operation.

9. The data storage device of claim 1, wherein the controller is further configured to accumulate additional uRuns for the uRegion during preparing and performing a non-blocking control sync operation.

10. A data storage device, comprising:
a memory device; and
a controller coupled to the memory device, wherein the controller is configured to:
perform a first consolidation on a first uRegion, wherein the first uRegion is a uRegion that has a greatest number of uRuns updated compared to other uRegions;
save a first mSet to cache, wherein the mSet includes uRuns from the first uRegion;
determine that another uRegion is ready for a second consolidation, wherein determining that another uRegion is read ready for a second consolidation comprises comparing uRegion uHeaders to a copy of the uRegion uHeaders, selecting the uRegion with max uRuns difference based on the comparison of the uRegion uHeaders to the copy of the uRegion uHeaders, and wherein if the difference between the uRuns in the uHeaders is the same for two uRegions, selecting the uRegion with max number of uRuns; and
perform the second consolidation on the another uRegion.

11. The data storage device of claim 10, wherein the another uRegion is the first uRegion.

12. The data storage device of claim 10, wherein prior to the second consolidation, uRuns from the first uRegion are merged with the first mSet.

13. The data storage device of claim 10, wherein the another uRegion is a uRegion that has a greatest number of uRuns updated compared to other uRegions.

14. The data storage device of claim 10, wherein the controller is configured to perform a consolidation operation prior to performing a control sync operation.

15. The data storage device of claim 14, wherein the control sync operation involves creating a copy of uHeaders.

16. The data storage device of claim 15, wherein the copy of uHeaders is retained during the first consolidation.

17. A data storage device, comprising:
means to store data; and
a controller coupled to the means to store data, wherein the controller is configured to:
retain a copy of uHeaders utilized during control sync operations for use during a consolidation operation; and
select a uRegion for the consolidation operation based upon a difference between the copy of uHeaders and uHeaders for uRuns, wherein the uRegion with max uRuns difference is selected, and wherein if the difference between the uRuns in the uHeaders is the same for two uRegions, the uRegion with max number of uRuns is selected.

18. The data storage device of claim 17, wherein the controller is further configured to:
delay writing mSets to the means to store data; and
write the mSets to cache prior to writing the mSets to the means to store data.

19. The data storage device of claim 17, wherein the data storage device is dynamic random access memory (DRAM) less.

* * * * *